March 19, 1957 — C. BERRY — 2,785,497
WATER DOG FISHING PLUG
Filed Feb. 18, 1955
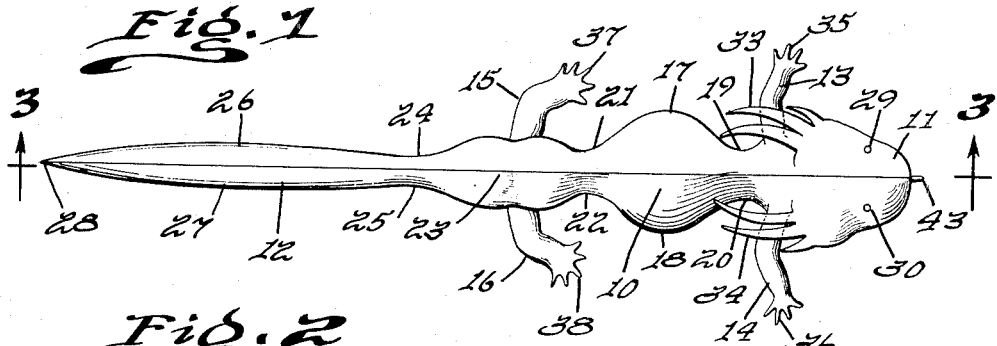
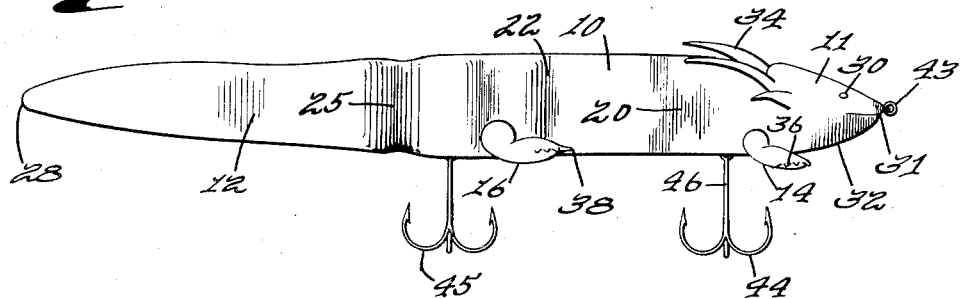
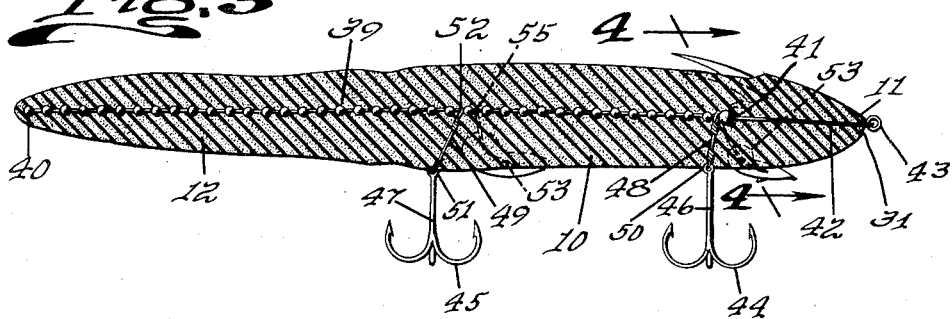
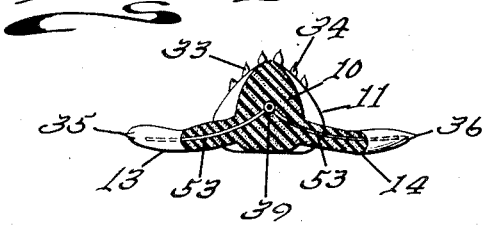
INVENTOR.
Cordell Berry
BY Victor J. Evans & Co.
ATTORNEYS

United States Patent Office 2,785,497
Patented Mar. 19, 1957

2,785,497
WATER DOG FISHING PLUG
Cordell Berry, Mesa, Ariz.

Application February 18, 1955, Serial No. 489,215

2 Claims. (Cl. 43—42.26)

This invention relates to fishing lures of the type designed to represent animals or other live bait, and in particular, a plug having an elongated body with a head having a line attaching eye at the forward end, with a tail extended from the opposite end and with pairs of arms extended from sides thereof.

The purpose of this invention is to provide an improved fishing lure which is shaped so that action is imparted thereto by water as the lure is drawn through the water.

Fishing lures have been provided of various types and designs and elements of different forms have been extended from bodies of lures to obtain action for attracting fish, however, it has been found that a body having recesses and bulges therein with arms and legs extended from the sides and with an elongated beaver type tail positioned in a vertical plane an unusual life-like action is obtained as the lure is drawn through water.

The object of this invention is, therefore, to provide means for forming the outer surfaces of a fishing lure to obtain an improved life-like action as the lure is drawn through water.

Another object of the invention is to provide an improved fishing lure having a head, tail, and legs mounted on an irregular shaped body whereby the surfaces produce an unusual action as the body is drawn through water.

A further object of the invention is to provide an improved fishing lure having a life-like action in which the lure is of a simple and economical construction.

With these and other objects and advantages in view, the invention embodies a lure formed of rubber or other suitable flexible plastic material having an elongated body and tail positioned in a vertical plane, with a head having feelers extended rearwardly therefrom mounted on the forward end of the body and with legs extended from sides of the body, and in which the legs and also hooks are attached to a beaded chain extended through the body and having a line attaching eye connected by a wire to the forward end.

Other features and advantages of the invention will appear from the accompanying drawing, wherein:

Figure 1 is a plan view of the improved fishing lure.

Figure 2 is a side elevational view of the lure with the parts as shown in Figure 1.

Figure 3 is a longitudinal section through the lure taken on line 3—3 of Figure 1.

Figure 4 is a cross section through the lure taken on line 4—4 of Figure 3.

Referring now to the drawing, wherein like reference characters denote corresponding parts, the improved fishing plug or lure of this invention includes a body 10 having a head 11, a tail 12, forward legs 13 and 14 and rear legs 15 and 16.

As illustrated in Figure 2, the body and tail are positioned in a vertical plane and the body is provided with a bulging section having extended portions 17 and 18 at the sides with recesses 19 and 20 between the portions 17 and 18 and the head 11 and with similar recesses 21 and 22 between the portions 17 and 18 and a rear portion 23 from which the tail 12 extends.

From the portion 23 the sides of the body converge forming arcuate recesses 24 and 25 at the base of the tail and from the recesses 24 and 25 the sides of the tail extend outwardly to points 26 and 27 from which points the sides converge to a point 28 at the tip of the tail.

The head 11 is formed with eyes 29 and 30 and a mouth 31 and the under surface, as indicated by the numeral 32, extended from the mouth 31 is adapted to be shaped to provide a wavy action as the plug is drawn through water.

The head 11 is also provided with feelers 33 on one side and 34 on the other and the forward legs 13 and 14, which have fingers 35 and 36, respectively, extended from ends thereof, extend from the sides of the body directly to the rear of the head.

The rear legs 15 and 16, the ends of which are also provided with fingers, as indicated by the numerals 37 and 38 extend from the sides of the rear portion 23 of the body and the ends of the rear legs are inclined forwardly, as illustrated in Figure 1.

A beaded chain 39 extends forwardly from a point 40 at the tip of the tail to a point 41 spaced to the rear of the head 11 and the forward end of the chain is connected by a wire 42 to an eye 43 to which a fishing line may be connected.

As illustrated in Figure 3, gang hooks 44 and 45, extended from shanks 46 and 47 are connected to the beaded chain with short wires 48 and 49, one end of the wire 48 being connected to an eye 50 at the end of the shank 46 and the opposite end being connected to the beaded chain 39 at the point 41. The wire 49 connecting the hook 45 to the lure is connected to an eye 51 on the end of the shank 47 and to the beaded chain 39, as shown at the point 52.

The forward legs 13 and 14 are reinforced with wires 53 which extend from the point 41 on the beaded chain into the forward legs, as shown in Figures 3 and 4, and similar wires 53 are connected to the beaded chain 39 at the point 55 and extend laterally through the rear legs 15 and 16, also as shown in Figure 3.

With the parts formed from rubber, or a suitable flexible plastic, action will be imparted to the lure as the lure is pulled through the water by a fishing line attached to the eye 43.

The irregular side surfaces formed by the recesses 19 and 20 behind the head and 21 and 22 which follow the bulging portions 17 and 18 provide lateral movements to the plug or lure as it travels through the water. In these lateral movements, the tail is also swished from side to side thereby increasing the attractiveness of the lure to fish in the water.

It will be understood that modifications, within the scope of the appended claims, may be made in the design and arrangement of the parts without departing from the spirit of the invention.

What is claimed is:

1. In a fishing lure, the combination which comprises an elongated rubber body having a head on one end and having an elongated tail extended from the opposite end, said body and tail being elliptical shaped in cross section and the long axis thereof being vertically positioned, said body having a bulging intermediate portion with recesses in the sides positioned between the head and the intermediate portion and also between said intermediate portion and the rear portion of the body, said body also having forwardly and rearwardly disposed legs extended from sides thereof, said head having feelers extended rearwardly therefrom, a beaded chain embedded in the body and extending from the tip of the tail to the base of the head, a wire extending from the end of the chain to a point outwardly of the head, and a line attaching eye connected to the outer end of the wire, a plurality of short wires embedded in the body and connected at one end to the beaded chain, hooks attached to the opposite ends of the short wires outwardly of the body and reinforcing wires connected to the beaded chain and extended into said legs.

2. In a fishing lure, the combination which comprises an elongated flexible plastic body having a head on one end and having an elongated tail extended from the opposite end, said body and tail being elliptical shaped in cross section and the long axis thereof being vertically positioned, said body having a bulging intermediate portion with recesses in the sides positioned between the head and the intermediate portion and also between said intermediate portion and the rear portion of the body, said body also having forwardly and rearwardly disposed legs extended from sides thereof, a beaded chain embedded in the body and extending from the tip of the tail to the base of the head, a wire extending from the end of the chain to a point outwardly of the head, and a line attaching eye connected to the outer end of the wire, a plurality of short wires embedded in the body and connected at one end to the beaded chain, hooks attached to the opposite ends of the short wires outwardly of the body and reinforcing wires connected to the beaded chain and extended into the legs.

References Cited in the file of this patent
UNITED STATES PATENTS

| | | |
|---|---|---|
| D. 121,694 | Nichols | July 30, 1940 |
| 1,689,541 | Welch | Oct. 30, 1928 |
| 1,846,538 | Albers et al. | Feb. 23, 1932 |
| 2,025,270 | Chaney | Dec. 24, 1935 |
| 2,187,666 | Schumann | Jan. 16, 1940 |
| 2,290,433 | Jeffers | July 21, 1942 |
| 2,690,026 | King | Sept. 28, 1954 |
| 2,722,766 | Accetta | Nov. 8, 1955 |

FOREIGN PATENTS

| | | |
|---|---|---|
| 393,514 | Great Britain | 1933 |

OTHER REFERENCES

American Wild Life, illustrated 1949, pp. 444 and 445, publication, published by Wm. H. Wise, Inc., New York, N. Y.